United States Patent
Bruner

(10) Patent No.: US 6,397,146 B1
(45) Date of Patent: May 28, 2002

(54) ACCELERATION COMPENSATION IN A GPS-INERTIAL NAVIGATION SYSTEM

(75) Inventor: Charles P. Bruner, Calabasas, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 77 days.

(21) Appl. No.: 09/689,387

(22) Filed: Oct. 12, 2000

Related U.S. Application Data

(60) Provisional application No. 60/167,784, filed on Nov. 29, 1999.

(51) Int. Cl.$^7$ ............................................. G01C 21/00
(52) U.S. Cl. ................... 701/213; 701/221; 342/357.14
(58) Field of Search ................ 701/213, 214, 701/216, 220, 221; 342/357.14

(56) References Cited

U.S. PATENT DOCUMENTS

| | | | | |
|---|---|---|---|---|
| 4,758,959 A | * | 7/1988 | Thoone et al. | 340/990 |
| 5,442,557 A | * | 8/1995 | Kaneko | 340/990 |
| 5,477,228 A | * | 12/1995 | Tiwari et al. | 342/357.03 |
| 5,703,597 A | * | 12/1997 | Yu et al. | 342/357.12 |
| 5,923,286 A | * | 7/1999 | Divakaruni | 342/357.06 |
| 6,182,011 B1 | * | 1/2001 | Ward | 342/357.09 |
| 6,278,945 B1 | * | 8/2001 | Lin | 701/216 |
| 6,311,129 B1 | * | 10/2001 | Lin | 342/422 |

FOREIGN PATENT DOCUMENTS

DE      4027393 A1  *  3/1992      ........... G01C/21/00

* cited by examiner

Primary Examiner—Michael J. Zanelli
Assistant Examiner—Eric M Gibson
(74) Attorney, Agent, or Firm—Robert E. Malm

(57) ABSTRACT

The invention is a method and apparatus for compensating for acceleration in a GPS-inertial navigation system. A translated satellite signal is a satellite signal translated in the GPS receiver to an intermediate-frequency band by a sequence of M mixing operations, M being an integer greater than or equal to one. The m'th mixing operation consists of mixing the satellite signal with an m'th mixing signal having a frequency $f_m$ where $f_m$ can be approximated by a function $F_m$ of one or more components $A_1$, $A_2$, and $A_3$ of the acceleration and one or more parameters $P_{m1}$, $P_{m2}$, ..., $P_{mN(m)}$ that are independent of acceleration. The method consists of (a) obtaining values for one or more components of acceleration, (b) obtaining values for one or more parameters, (c) determining the value of one or more functions $F_m$, and (d) utilizing the data obtained in steps (a), (b), and (c) in compensating for the effects of acceleration in a GPS receiver.

23 Claims, 1 Drawing Sheet

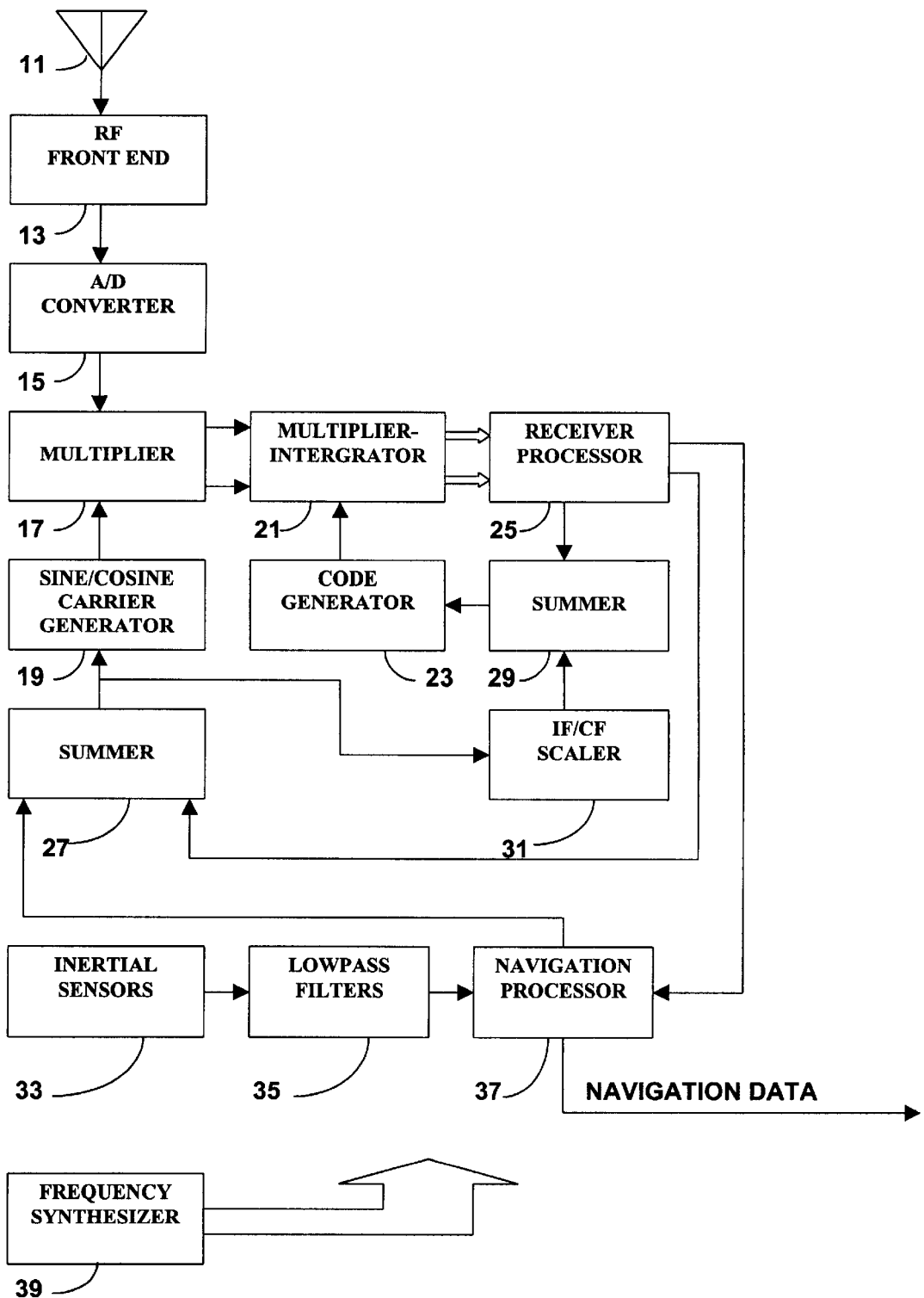

ACCELERATION COMPENSATION IN A GPS-INERTIAL NAVIGATION SYSTEM

CROSS-REFERENCE TO RELATED APPLICATIONS

This application claims the benefit of U.S. Provisional Application No. 60/167,784, filed Nov. 29, 1999.

STATEMENT REGARDING FEDERALLY SPONSORED RESEARCH AND DEVELOPMENT (Not applicable)

BACKGROUND OF THE INVENTION

This invention relates generally to GPS-inertial navigation systems and more specifically to the compensation for changes in the GPS-receiver reference frequency resulting from environmental acceleration. The acronym "GPS" stands for the well-known Global Positioning System which provides the means for world-wide navigation using signals transmitted by a plurality of satellites.

The performance of GPS-inertial navigation systems in high-performance vehicles tends to be unacceptable in jamming environments. To accommodate the large Doppler shifts in frequency of the received GPS signals associated with high-performance vehicles, the filter bandwidths in the GPS receiver tracking loops must be increased, thereby making the GPS receiver more susceptible to jamming. Velocity aiding of GPS-receiver carrier-frequency tracking loops using inertial measurements permits the use of tracking-loop filters of lower order and reduced bandwidth with the accompanying advantage of reduced susceptibility to jamming signals. The degree to which the carrier-frequency tracking-loop filter bandwidth can be reduced is limited primarily by reference oscillator phase noise and by frequency shifting of the oscillator as a result of acceleration stress experienced by the crystal that serves as the oscillator frequency reference. There is a need for a means for compensating for the effects of acceleration in the GPS receiver.

BRIEF SUMMARY OF THE INVENTION

The invention is a method and apparatus for compensating for acceleration in a GPS-inertial navigation system. A translated satellite signal is a satellite signal translated in the GPS receiver to an intermediate-frequency band by a sequence of M mixing operations, M being an integer greater than or equal to one. The m'th mixing operation consists of mixing the satellite signal with an m'th mixing signal having a frequency $f_m$ where $f_m$ can be approximated by a function $F_m$ of one or more components $A_1, A_2$, and $A_3$ of the acceleration and one or more parameters $P_{m1}$, $P_{m2}, \ldots, P_{mN(m)}$ that are independent of acceleration.

The method consists of (a) obtaining values for one or more components of acceleration, (b) obtaining values for one or more parameters, (c) determining the value of one or more functions $F_m$, and (d) utilizing the data obtained in steps (a), (b), and (c) in compensating for the effects of acceleration in a GPS receiver.

BRIEF DESCRIPTION OF THE DRAWINGS

The FIGURE is a block diagram of an integrated GPS-inertial navigation system wherein the method of the invention is practiced.

DETAILED DESCRIPTION OF THE INVENTION

A functional block diagram of a GPS-inertial navigation system is shown in the FIGURE. GPS signals from a plurality of satellites are received on a vehicle by antenna 11, amplified and translated to an intermediate-frequency (IF) band by the radio-frequency (RF) front end 13, and then converted to a sequence of digitized samples by analog-to-digital (A/D) converter 15. The sequence of digitized samples corresponds to an IF sinusoid modulated with a pseudorandom bit sequence ("code"), the term "IF" denoting a frequency in the IF band. The IF of a satellite signal may appear anywhere in the IF band depending on the Doppler shift in frequency of the satellite signal.

The boxes 17 through 31 are duplicated for each satellite signal to be received and demodulated. An optional configuration is to use a single multiplexed receiver processor 25 (rather than a plurality of receiver processors 25) for all satellite signals being received. Multiplier 17 produces inphase and quadrature sequences by separately multiplying the sequence of digitized samples from A/D converter 15 by (1) a sequence of digitized samples of a sine wave and (2) a sequence of digitized samples of a cosine wave provided by sine/cosine carrier generator 19. The argument of the sine- and cosine-wave sequences is the accumulated sum resulting from a repeated summing modulo one of a phase input $\phi_{carrier}$ to a phase accumulator in the sine/cosine carrier generator 19, assuming the phase input is expressed as a fraction of a cycle. The frequency $f_{carrier}$ of the sine and cosine waves is given by $$f_{carrier} = f_{CLcarrier} \phi_{carrier} \qquad (1)$$

where $f_{CLcarrier}$ is the clocking frequency for the phase accumulator in the sine/cosine carrier generator 19.

The clocking frequency $f_{carrier}$ is derived from a reference signal produced by a reference oscillator in frequency synthesizer 39. The frequency of the reference signal varies with acceleration. However, $f_{Clcarrier}$, because of its magnitude, is only weakly dependent on acceleration, and this functional dependence can in general be ignored in applying equation (1). If one wishes to compensate for the weak effect of acceleration on $f_{Clcarrier}$, one simply substitutes $F_{Clcarrier}$ for $f_{Clarrier}$ in equation (1) where $$f_{CLcarrier} = F_{CLcarrier}(A_1, A_2, A_3, P_1, P_2, \ldots, P_N) \qquad (2)$$

and $F_{CLcarrier}$ is a function of the components $A_1, A_2$, and $A_3$ of vehicle acceleration in a frame of reference fixed with respect to the vehicle and fixed-value parameters $P_1, P_2, \ldots, P_N$.

Multiplier-integrator 21 separately multiplies the inphase and quadrature sequences supplied by multiplier 17 with each of three codes that are replicas of the code that modulates the signal received from the satellite and integrates the results. The six integrated results correspond to the correlations of the inphase and quadrature sequences with the three replica codes. The three replica codes, consisting of "prompt", "early", and "late" codes, are generated by code generator 23. The early and late codes are advanced and delayed respectively with respect to the prompt code by one-half the code clock period.

The code generator 23 generates a square-wave clocking signal for generating the desired replica codes. The argument of the early-code clocking signal is the accumulated result of a repeated summing modulo one of a phase input $\phi_{code}$ in a phase accumulator in the code generator 23, assuming the phase input is expressed as a fraction of a cycle. The frequency $f_{code}$ of the early-code clocking signal is related to the phase input $\phi_{code}$ by the equation $$f_{code} = f_{CLcode} \phi_{code} \qquad (3)$$

where $f_{CLcode}$ is the clocking frequency of the accumulator in the code generator 23.

Receiver processor 25 determines two control sequences from the six correlation values periodically determined by multiplier-integrator 21. One control sequence provides a measure of the phase difference between the A/D converter sequence and the sine-wave sequence and is used as one component of the phase input $\phi_{carrier}$ supplied to the sine/cosine carrier generator 19 via the summer 27 for the purpose of maintaining the phase difference between the A/D converter sequence and the sine wave sequence at zero. The other control sequence provides a measure of the time offset of the A/D-converter-sequence code from the prompt-replica code and is used to adjust the phase input $\phi_{code}$ to the code generator 23 via summer 29 for the purpose of maintaining the prompt-replica code in synchronism with the satellite-signal code.

In order to provide a more sensitive measure of the time offset of the inphase-sequence code from the prompt-replica code, the control sequence out of summer 27 is scaled appropriately and fed into summer 29.

GPS-receiver time is kept by a GPS-receiver clock which is nominally in synchronism with a corresponding clock maintained in the satellite. The difference, expressed in units of range, between the GPS-receiver time that a particular code bit is transmitted by the satellite and the GPS-receiver time that the same bit is received by the GPS receiver is called the "pseudorange" to the satellite. The pseudorange is not exactly equal to the range because the satellite and GPS-receiver clocks are not exactly in synchronism. Similarly, the change in pseudorange over a specified time interval is called "delta pseudorange". Delta pseudorange is not exactly equal to delta range (i.e. the change in range over a specified time interval) because the GPS-receiver and satellite clocks are not running at exactly the same rate.

The inertial sensors 33 provide measures of three components of acceleration and three components of angular velocity along instrument axes fixed with respect to the vehicle in which the navigation system is located. The acceleration and angular velocity components are passed through lowpass filters 35 into navigation processor 37 which produces navigation data utilizing a Kalman filter process. The receiver processor 25 typically supplies pseudorange and delta pseudorange to the navigation processor 37 as observables for use in the Kalman filter process and may in some cases supply other quantities that can be used as observables.

A frequency synthesizer 39 generates sinusoids and/or square waves of specified frequencies for use in the navigation system from a reference-frequency signal supplied by a reference oscillator. In general, the frequency $f_s$ of a signal originating from satellite S and appearing at the antenna 11 can be expressed as $$f_s = f_{CS} + f_{SD} + f_{VD} \quad (4)$$

where $f_{CS}$ is the satellite carrier frequency, $f_{SD}$ is the Doppler shift resulting from satellite motion, and $f_{VD}$ is the Doppler shift resulting from vehicle motion.

A satellite signal received by antenna 11 is translated to an intermediate frequency band by one or more mixing operations performed in the RF front end 13. A mixing operation consists of multiplying the satellite signal with a mixing signal thereby creating upper and lower sidebands centered on the carrier frequency. The lower-sideband is selected for further processing.

A succession of mixing operations may be performed in the RF front end 13. The frequency $f_{SIFB}$ of a satellite signal at the output of the RF front end 13 can therefore be expressed as $$f_{SIFB} = f_{CS} - f_1 - f_2 - f_3 + f_{SD} + F_{VD} \quad (5)$$

where we have assumed three mixing signals with frequencies $f_1$, $f_2$, and $f_3$ for purposes of illustration.

An acceleration that produces a one percent change in the reference frequency will produce a one percent change in the frequencies $f_1$, $f_2$, and $f_3$ which are derived from the reference frequency.

The frequency $f_m$ of the m'th mixing signal derived from the reference-oscillator signal can be approximated by the expression $$f_m = F_m(A_1, A_2, A_3, P_{m1}, P_{m2}, \ldots, P_{mN(m)}) \quad (6)$$

where $F_m$ is a function of the components $A_1$, $A_2$, and $A_3$ of vehicle acceleration in a frame of reference fixed with respect to the vehicle and fixed-value parameters $P_{m1}$, $P_{m2}, \ldots, P_{mN(m)}$. The integer N(m) may be a function of m. The frequency of the reference-oscillator signal is usually locked to the mechanical vibration of a crystal. The force exerted on the crystal as a result of the vehicle's acceleration causes the mechanical vibration frequency of the crystal to change. The vibration frequency depends only on the vehicle's acceleration and does not depend on which satellite signal is being received. In the case of a crystal reference oscillator the function $F_m$ can sometimes be approximated by the first-order terms of a power series expansion:

$$F_m = C_{m0} + C_{m1}A_1 + C_{m2}A_2 + C_{m3}A_3 \quad (7)$$

The parameters $C_{m0}$, $C_{m1}$, $C_{m2}$, and $C_{m3}$ depend on the particular crystal, its mounting arrangement, and its orientation with respect to the frame of reference. The values of the parameters can be determined by a calibration process.

Let us assume for the moment that the sine/cosine carrier generator 19 generates compensating sine and cosine waves with frequency $f_{COMP}$ where $$f_{COMP} = f_{CR} - F_1 - F_2 - F_3 - f_P \quad (8)$$

The frequency $f_{CR}$ is nominally the same as $f_{CS}$ but will actually be slightly different because the frequencies of the satellite reference oscillator and the GPS receiver reference oscillator will be slightly different. The frequency $f_P$ is automatically determined as a result of feedback from receiver processor 25 and navigation processor 37 through summer 27 to sine/cosine carrier generator 19.

The multiplication of the compensating sine and cosine waves produced by sine/cosine carrier generator 19 and the output of the A/D) converter 15 results in signals that are the sum and difference of the frequencies given by equations (5) and (8). The signals with the sum frequency are removed by subsequent processing and can therefore be ignored.

The difference frequency is given by $$f_{SIFB} - F_{COMP} = (f_{CS} - f_{CR}) - (f_1 - F_1) - (f_2 - F_2) - (f_3 - F_3) + f_{SD} + f_{VD} + f_P \quad (9)$$

The terms in parentheses involving the mixing frequencies will be approximtely zero and can be ignored. The above equation can consequently be rewritten as $$F_{SIFB} - F_{COMP} \approx (f_{CS} - f_{CR}) + f_{SD} + f_{VD} + f_P \quad (10)$$

The term in parentheses relates to the error in frequency of the reference-frequency oscillator in the GPS receiver with respect to the corresponding reference-frequency oscillator in the satellite.

It should be noted that the frequency of the output signal from the multiplier 17 is not dependent on the acceleration. The sensitivity of the $f_m$'s to acceleration has been compensated by the $F_m$'s. It should also be noted that frequency $f_1$ is generally substantially larger than the other $f_m$'s and consequently, it may be possible in many cases to approximate the $F_m$'s other than $F_1$ by the zero-order term in a power series expansion, i.e. by constants, independent of acceleration.

Receiver processor 25 maintains $f_{SIFB}-f_{COMP}$ at zero in which case $$-f_P = (f_{CS}-f_{CR}) + f_{SD} + f_{VD} \quad (11)$$

The quantity on the right, when properly scaled, becomes the delta pseudorange that is supplied by receiver processor 25 to navigation processor 37 as an observable for the Kalman filter process performed by the navigation processor 37.

We now assume that the navigation processor 37 supplies a phase $\phi_{NP}$ through summer 27 to sine/cosine generator 19 where $$\phi_{NP} = \frac{1}{f_{CLcarrier}}[f_{VD}^C - F_1 - F_2 - F_3 + (f_{CS} - f_{CR})^C] \quad (12)$$

where $f_{VD}^C$ is a calculated value of the Doppler component resulting from the vehicle's velocity and $(f_{CS}-f_{CR})^C$ is the calculated value of the quantity in parentheses that results from the performance of a Kalman filter process by the navigation processor 37.

We also assume that the receiver processor 25 supplies a phase $\phi_{RP}$ through summer 27 to sine/cosine generator 19 where $$\phi_{RP} = \frac{1}{f_{CLcarrier}}(f_{CR}-f_P) \quad (13)$$

The results of these two phase components are compensating sine and cosine waves from sine/cosine carrier generator 19 with a frequency $f_{COMP}$ given by $$F_{COMP} = f_{CR} - f_P + f_{VD}^C - F_1 - F_2 - F_3(f_{CS}-f_{CR})^C \quad (14)$$

The resulting signal out of multiplier 17 has a frequency given by $$f_{SIFB} - F_{COMP} = (f_{CS}-f_{CR}) - (f_{CS}f_{CR})^C (f_1-F_1) - (f_2-F_2) - (f_3-F_3) + (f_{VD}-f_{VD}^C) + f_{SD} + f_P \quad (15)$$

The first two quantities on the right tend to cancel each other and the remaining quantities in parentheses are approximately zero. Thus, $$f_{SIFB} - f_{COMP} \approx f_{SD} + f_P \quad (16)$$

The receiver processor 25 requires that the above quantity be zero which is accomplished by adjusting $f_P$ so as to maintain the frequency of the signal out of multiplier 17 at zero. Under these circumstances, $f_P$ equals $f_{SD}$ and thus is a slowly-varying quantity in that it is the Doppler associated with a satellite and not that associated with the rapidly-changing velocity of a high-performance vehicle. As a result, the control loop filters in the GPS receiver can have very small bandwidths and the system can provide significant resistance to jamming signals. The receiver processor 25 scales $f_P$ and supplies the result (instead of the customary delta pseudorange) to the navigation processor 37 for use as a Kalman filter observable.

An alternative approach is to omit $(f_{CS}-f_{CR})^C$ in equation (11) in which case equation (14) changes to $$f_{SIFB} - F_{COMP} \approx f_{CS} - f_{CR} + f_{SD} + f_P \quad (17)$$

The receiver processor 25 requires that the above quantity be zero which is accomplished by adjusting $f_p$ so as to maintain the frequency of the signal out of the multiplier 17 at zero. Under these circumstances, $$-f_P = f_{CS} - f_{CR} + f_{SD} \quad (18)$$

The receiver processor 25 scales $f_p$ and supplies the result (instead of the customary delta pseudorange" to the navigation processor 37 for use as a Kalman filter observable.

Since the parameters $P_{m1}, P_{m2}, \ldots, P_{mN(m)}$ may change over time as a result of aging of the thing in the reference oscillator that acts as the frequency reference of the oscillator, it may be advisable to include errors $\delta P_{m1}, \delta P_{m2}, \ldots, \delta P_{mN(m)}$ in these quantities as members of the Kalman filter state vector. The measured delta range or delta pseudorange, in addition to the usual error terms, may include one or more terms proportional to $\partial F_m/\partial P_n(\delta P_n)$ where n takes on values from 1 to N(m). Consequently, the result of applying the Kalman filter observation matrix to the Kalman filter error state vector will include terms proportional to $\partial F_m/\partial P_n(\delta P_n)$ where the prime denotes the estimated error from the Kalman filter process.

In the case of a crystal reference where $F_{LG}$ can be approximated by the zero- and first-order terms of a power series expansion in three components of acceleration as shown by equation (6), the errors $\delta C_{m0}, \delta C_{m1}, \delta C_{m2}$, and $\delta C_{m3}$ are included as members of the Kalman filter state vector. The measured delta range or delta pseudorange, in addition to the usual other error terms, will include terms proportional to $\delta C_{m0}, A_1 \delta C_{m1}, A_2 \delta C_{m2}$, and $A_3 \delta C_{m3}$. The result of applying the Kalman filter observation matrix to the Kalman filter error state vector will include the terms $\delta C'_{m0}, A_1 \delta C'_{m1}, A_2 \delta C'_{m2}$, and $A_3 \delta C'_{m3}$, where the primes denote the estimated errors from the Kalman filter process.

What is claimed is:

1. A method for compensating for acceleration in a GPS-inertial navigation system, a translated satellite signal being a satellite signal translated in the GPS receiver to an intermediate-frequency band by a sequence of M mixing operations, M being an integer greater than or equal to one, the m'th mixing operation consisting of mixing the satellite signal with an m'th mixing signal having a frequency $f_m$ where $f_m$ can be approximated by a function $F_m$, of one or more components $A_1, A_2$, and $A_3$ of the acceleration and one or more parameters $P_{m1}, P_{m2}, \ldots, P_{mN(m)}$ that are independent of acceleration, the method comprising the steps:

(a) obtaining values for one or more components of acceleration;

(b) obtaining values for one or more parameters;

(c) determining the value of one or more functions $F_m$;

(d) utilizing the data obtained in steps (a), (b), and (c) in compensating for the effects of acceleration in a GPS receiver.

2. The method of claim 1 wherein in step (a) the value of a component of acceleration is obtained from an accelerometer that experiences the same acceleration as the GPS receiver.

3. The method of claim 1 wherein in step (b) the values of the one or more parameters are obtained by a calibration process comprising the steps:

(b1) measuring the value of $f_m$ for each of a plurality of values for the components of acceleration, each measurement resulting in an equation $f_m = F_m$ wherein the only undetermined quantities are one or more parameters;

(b2) solving a plurality of equations for the values of the one or more parameters.

4. The method of claim 1 wherein in step (b) the values of the one or more parameters are determined by a Kalman filter process.

5. The method of claim 1 wherein step (d) comprises the steps:

(d1) synthesizing one or more compensating mixing signals having a frequency that varies with acceleration, the variation in frequency with acceleration of the compensating mixing signals approximating the variation in frequency with acceleration of the translated satellite signal;

(d2) mixing the translated satellite signal with the one or more compensating mixing signals thereby obtaining one or more signals having a difference frequency that is the difference between the frequencies of the translated satellite signal and the one or more compensating mixing signals.

6. The method of claim 5 wherein step (d1) comprises the steps:

(d1a) calculating a value of the frequency $f_{COMP}$ of the one or more compensating mixing signals, $f_{COMP}$ being the sum of one or more frequency components;

(d1b) generating one or more compensating mixing signals having a frequency equal to $f_{COMP}$.

7. The method of claim 6 wherein in step (d1a) the calculation of the values of one or more frequency components utilizes the results of step (c).

8. The method of claim 6 wherein one of the frequency components is a calculated value of the Doppler shift in frequency arising as a result of motion of the vehicle in which the GPS-inertial navigation system is installed.

9. The method of claim 6 wherein one of the frequency components is a calculated value of the difference in frequencies of the satellite reference oscillator and the GPS receiver reference oscillator scaled by the ratio of the satellite-signal frequency and the satellite reference oscillator frequency.

10. The method of claim 5 wherein in step (d1) there are two compensating mixing signals, one compensating mixing signal being a sine wave, the other compensating mixing signal being a cosine wave.

11. The method of claim 5 wherein step (d1) comprises the steps:

(d1a) calculating a value of the frequency $f_{COMP}$ of the one or more compensating mixing signals, $f_{COMP}$ being the sum of one or more frequency components;

(d1b) calculating the phase $\phi_{COMP}$ by dividing $f_{COMP}$ by a function $F_{CL}$ of one or more components $A_1$, $A_2$, and $A_3$ of the acceleration and one or more parameters $P_{CL1}$, $P_{CL2}$, . . . , $P_{CLN(CL)}$ that are independent of acceleration, $F_{CL}$ being an approximation of the frequency $f_{CL}$ of a clock signal derived from the frequency reference of the GPS receiver;

(d1c) generating the argument for the one or more compensating mixing signals by accumulating the phase $\phi_{COMP}$ at a rate $f_{CL}$;

(d1d) generating one or more compensating mixing signals having the argument obtained in step (d1c).

12. Apparatus for practicing the method of claim 1.

13. Apparatus for compensating for acceleration in a GPS-inertial navigation system, a translated satellite signal being a satellite signal translated in the GPS receiver to an intermediate-frequency band by a sequence of M mixing operations, M being an integer greater than or equal to one, the m'th mixing operation consisting of mixing the satellite signal with an m'th mixing signal having a frequency $f_m$ where $f_m$ can be approximated by a function $F_m$ of one or more components $A_1$, $A_2$, and $A_3$ of the acceleration and one or more parameters $P_{m1}$, $P_{m2}$, . . . , $P_{mN(m_1)}$ that are independent of acceleration, the apparatus comprising:

one or more accelerometers for obtaining values for one or more components of acceleration;

a memory and retrieval means for obtaining values for one or more parameters;

a data processor for determining the values of one or more functions $F_m$;

a signal processor that utilizes the values of one of more functions $F_m$ in compensating for the effects of acceleration in a GPS receiver.

14. The apparatus of claim 13 wherein the one or more accelerometers experience the same acceleration as the GPS receiver.

15. The apparatus of claim 13 wherein the data processor determines the values of the one or more parameters by (1) measuring the value of $f_m$ for each of a plurality of values for the components of acceleration, each measurement resulting in an equation $f_m = F_m$ wherein the only undetermined quantities are one or more parameters and (2) solving a plurality of equations for the values of the one or more parameters.

16. The apparatus of claim 13 wherein the data processor determines the values of the one or more parameters by a Kalman filter process.

17. The apparatus of claim 13 wherein the signal processor comprises:

a signal synthesizer for synthesizing one or more compensating mixing signals having a frequency that varies with acceleration, the variation in frequency with acceleration of the compensating mixing signals approximating the variation in frequency with acceleration of the translated satellite signal;

one or more mixers for mixing the translated satellite signal with the one or more compensating mixing signals thereby obtaining one or more signals having a difference frequency that is the difference between the frequencies of the translated satellite signal and the one or more compensating mixing signals.

18. The apparatus of claim 17 wherein the data processor calculates a value of the frequency $f_{COMP}$ of the one or more compensating mixing signals, $f_{COMP}$ being the sum of one or more frequency components, and the signal processor generates one or more compensating mixing signals having a frequency equal to $f_{COMP}$.

19. The apparatus of claim 18 wherein the calculation of the values of one or more frequency components utilizes the values of one or more functions $F_m$.

20. The apparatus of claim 18 wherein one of the frequency components is a calculated value of the Doppler shift in frequency arising as a result of motion of the vehicle in which the GPS-inertial navigation system is installed.

21. The apparatus of claim 18 wherein one of the frequency components is a calculated value of the difference in frequencies of the satellite reference oscillator and the GPS receiver reference oscillator scaled by the ratio of the satellite-signal frequency and the satellite reference oscillator frequency.

22. The apparatus of claim 17 wherein there are two compensating mixing signals, one compensating mixing signal being a sine wave, the other compensating mixing signal being a cosine wave.

23. The apparatus of claim 17 wherein:

the data processor calculates (1) a value of the frequency $f_{COMP}$ of the one or more compensating mixing signals, $f_{COMP}$ being the sum of one or more frequency components and (2) the phase $\phi_{COMP}$ by dividing $f_{COMP}$ by a function $F_{CL}$ of one or more components $A_1$, $A_2$, and $A_3$ of the acceleration and one or more parameters $P_{CL1}$, $P_{CL2}$, . . . , $P_{CLN(CL)}$ that are independent of acceleration, $F_{CL}$ being an approximation of the frequency $f_{CL}$ of a clock signal derived from the frequency reference of the GPS receiver;

the signal processor generates (1) the argument for the one or more compensating mixing signals by accumulating the phase $\phi_{COMP}$ at a rate $f_{CL}$ and (2) one or more compensating mixing signals having the argument.

* * * * *